B. BARLOW.
CLOSURE FOR CULTURE CONTAINERS.
APPLICATION FILED FEB. 18, 1918.

1,283,040. Patented Oct. 29, 1918.

WITNESSES

INVENTOR
B. Barlow
BY
ATTORNEYS

UNITED STATES PATENT OFFICE.

BRONSON BARLOW, OF CHICAGO, ILLINOIS.

CLOSURE FOR CULTURE-CONTAINERS.

1,283,040.  Specification of Letters Patent.  Patented Oct. 29, 1918.

Application filed February 18, 1918. Serial No. 217,936.

*To all whom it may concern:*

Be it known that I, BRONSON BARLOW, a citizen of the United States, and a resident of Chicago, in the county of Cook and State of Illinois, have invented a new and Improved Closure for Culture-Containers, of which the following is a full, clear, and exact description.

Bacteria yeasts and molds useful in the fermentation industries, in the dairy industry and in agriculture are at present transported in a variety of containers, some of which are fitted with air-tight closures. When the initial volume of air inclosed has been used up in the process of life and growth no more is available and the organism ceases to multiply and may even die for want of air.

Again, some cultures evolve gases during growth, and these gases when held within an air-tight container may form an atmosphere unfavorable to the further respiration and growth of the culture. Moreover, there are some cultures which evolve such volumes of gas as to blow out the closure or even break the container, causing loss and damage.

The closure which I have invented obviates all these difficulties and has other merits which will appear as the description proceeds.

1. It admits air at all times in volume sufficient for the best growth of the culture and yet, at the same time, it prevents excessive evaporation of moisture from the culture.

2. It insures the removal of gaseous and volatile products of growth harmful to the continuation of growth.

3. It prevents gas pressure within the container and consequent blowing out of the closure or rupture of the container.

4. It filters and purifies all entering air, thus preventing any contamination after the closure has been applied.

In the accompanying drawings, forming part of the application, similar characters of reference indicate corresponding parts in all the views.

Figure 1:
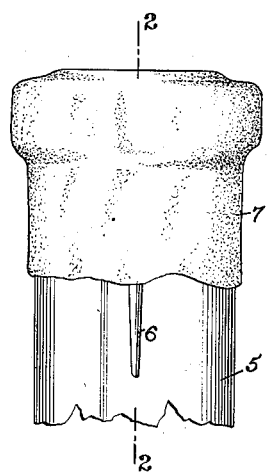
Figure 1 is a fragmentary elevation of the mouth of the container provided with a closure embodying my invention.
Figure 2:
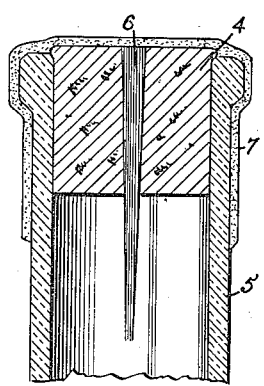
Fig. 2 is a vertical section on line 2—2, Fig. 1.
Figure 3:
Fig. 3 is a section through the cork and wooden plug used as a stopper for the container.
Figure 3:
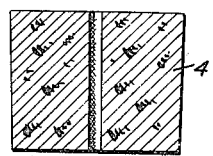

The culture medium, preferably nutrient agar agar, or a moist solid medium, is filled into the containers, care being taken to leave a space for air. The container is closed with a temporary closure of cotton and the whole is sterilized in flowing steam or in steam under pressure in the usual way. The medium is now inoculated and the special closure which is the subject of this invention is applied.

A cork stopper 4 is perforated from top to bottom with a central bore and a wood peg 6 is inserted tightly in the perforation, pointed end down and flat end flush with the surface of the cork. The cork with the peg inserted is sterilized in a dry heat oven and applied as a closure in a culture container which may be of glass, metal, or other material. If desired, the cork and peg can be sterilized separately. The cork is then inserted, inoculation is effected through the perforation in the cork, and finally the peg is inserted. The wood peg is porous and allows air to enter the container. A plaster of thin consistency is made by mixing together plaster of Paris, hydrated lime and water, about six parts by volume of plaster of Paris with one part by volume of hydrated lime and water sufficient to make a plaster of suitable consistency.

The culture container closed with its cork and peg is now dipped mouth down in the soft plaster and quickly removed with a coating or layer of plaster adhering over it. The plaster promptly sets and forms a hard porous cap or seal 7 for the container. After the primary setting, which takes several hours, the container is dipped cap down in a hot saturated solution of borax in water or in a solution of metallic sulfate, such as sulfate of iron. This second dipping supplies sufficient water for the complete setting of the plaster, and also impregnates the porous seal with a material which hardens it. The plaster Paris forms the cap; the hydrated lime effectually sterilizes the whole mass; the borax or metallic sulfate hardens it and also makes the whole mass permanently incapable of supporting the growth of any bacteria or spores which might fall upon the cap after its closure and during the period previous to the use of the culture. As soon now as the caps of the sealed containers are dry, the cultures are ready for transportation and use.

With every change in temperature or pressure air enters or leaves the container through the porous cap of plaster and through the pores of the wood peg. Experience has shown that air passes in sufficient volume for the best growth and for the prolonged life of organism which require abundant air for their growth and life.

This closure is also efficient in preventing the blowing out of the cork or stopper when propagating cultures of yeasts or other gas-generating organisms.

This closure cannot be destroyed by mice, which attack ordinary cork stoppers to get at the moist, nutritious, odorous cultures within the containers.

The cap or seal of plaster prevents the removal of the cultures by inadvertence and it makes apparent any wilful, mischievous or unauthorized removal of the cultures prior to its intended use.

I claim:

1. A closure for culture containers comprising a cork stopper having a central bore, a wood peg removably mounted in said bore completely filling the same, and extending below the cork, and a sealing cap for protecting the cork and peg and maintaining the peg in position.

2. A closure for culture containers comprising a stopper, a wood peg traversing the stopper and extending below same, the upper end of the peg flush with the upper face of the stopper, and a porous sealing cap covering the stopper and peg.

3. A closure for culture containers consisting of a cork stopper having a central bore therethrough, and a tapered porous wood plug frictionally held within said bore and completely filling the same, the smaller end of said porous plug extending below the cork well into the container.

4. A closure for culture containers, comprising in combination a cork stopper fitting the neck of the container and having a central bore therethrough, a tapered porous wood plug fitted within said bore, completely filling the same and the smaller end projecting below the stopper into the container, and porous means covering the stopper and plug and permitting exosmosis through the plug and also holding the same in place within the bore of the stopper.

BRONSON BARLOW.